May 19, 1959  H. F. HOBBS  2,887,198
VARIABLE-RATIO POWER TRANSMISSION
Filed Dec. 29, 1955  3 Sheets-Sheet 1
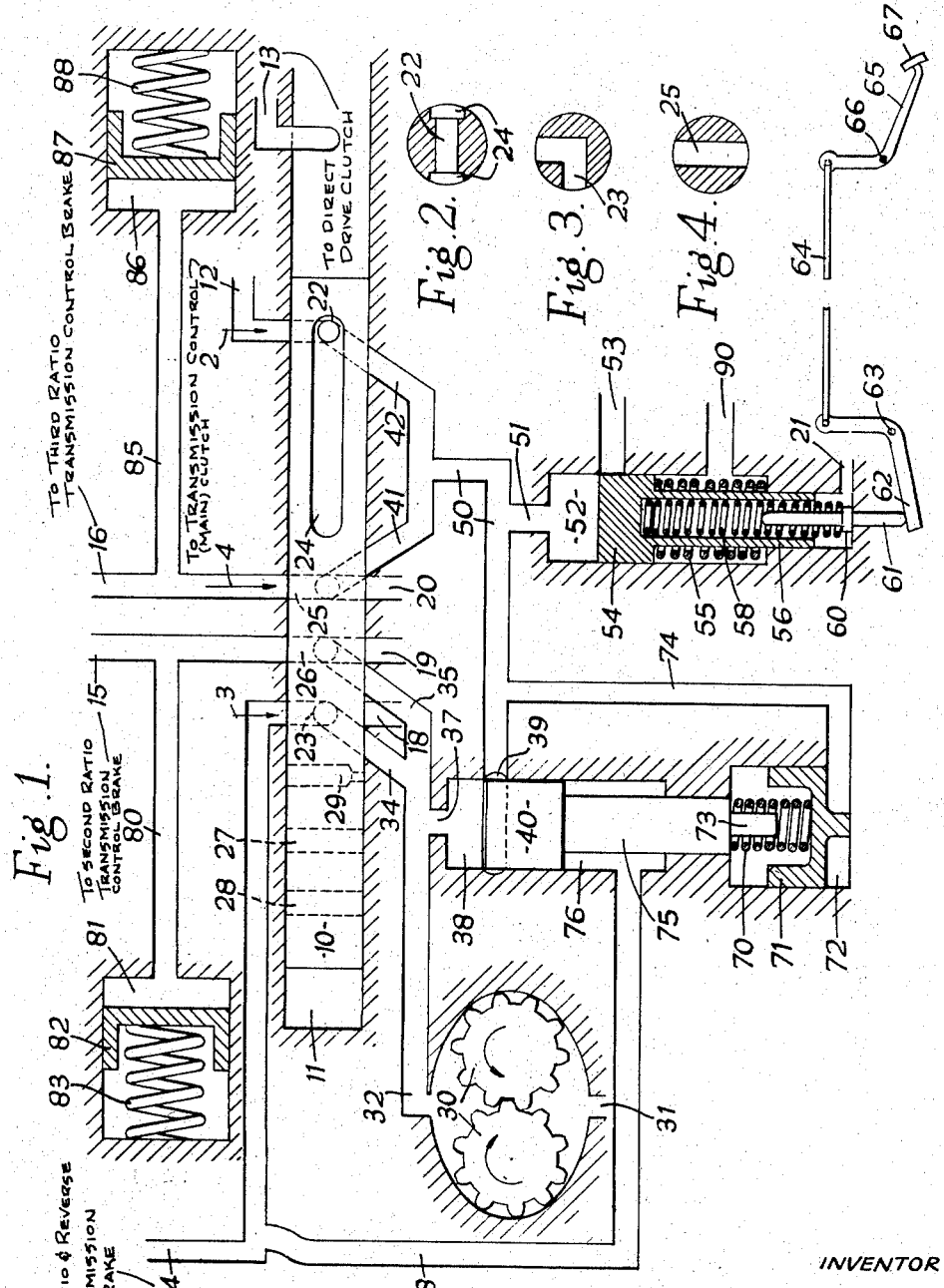
INVENTOR
HOWARD FREDERICK HOBBS
BY
Young, Emery & Thompson
ATTORNEYS May 19, 1959  H. F. HOBBS  2,887,198
VARIABLE-RATIO POWER TRANSMISSION
Filed Dec. 29, 1955  3 Sheets-Sheet 2

HOWARD FREDERICK HOBBS
INVENTOR
by Irwin S. Thompson
ATTORNEY

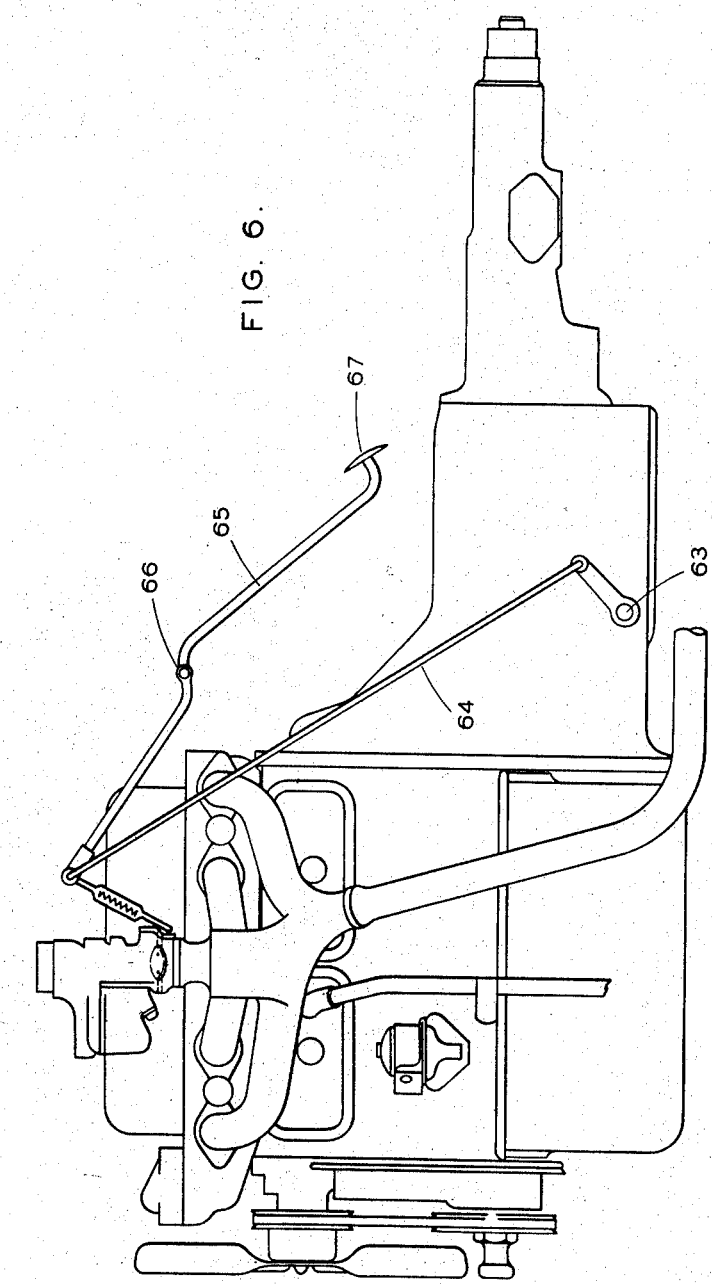

United States Patent Office 2,887,198
Patented May 19, 1959

2,887,198

VARIABLE-RATIO POWER TRANSMISSION

Howard Frederick Hobbs, Leamington Spa, England, assignor to Hobbs Transmission Limited, Leamington Spa, England Application December 29, 1955, Serial No. 556,312

Claims priority, application Great Britain December 30, 1954

13 Claims. (Cl. 192—.072)

This invention relates to variable-ratio power transmission apparatus having one or more input engagement clutches and one or more reaction brakes, both the clutches and brakes being engaged by liquid pressure controlled by a suitable valve control device to effect changes of transmission ratios. In such apparatus it has been proposed to provide two separate liquid supply circuits provided with separate release valves or other means for controlling the liquid pressure such that the pressure in the clutch circuit is less than that in the brake circuit at least in certain ratios and to provide means which vary the liquid pressure in the clutch circuit according to the degree of throttle opening of the engine with which the transmission is connected. In operating this type of transmission it has been found that the supply of liquid to the clutches when first selected may be insufficiently rapid. Moreover, the brake was usually operated always at the same engaging pressure and consequently the engagement of the brake may be too rapid in certain conditions to provide smooth engagement, this engagement being at times so rapid that insufficient time was available for the engine speed to reach its required higher speed when changing ratio down. A still further difficulty was that when releasing the brake or brakes the liquid would exhaust too quickly, i.e. before other clutches or brakes became engaged for producing the next ratio or too slowly causing drag and shock if overlapping means were employed. Mere variations of the pressure in these circuits resulted in the same problems arising at other speeds or ratios, or other difficulties arising.

According to the present invention the apparatus comprises a variable-ratio power transmission having at least one input engagement clutch and at least one reaction brake, hydraulic means including a valve control device for supplying liquid pressure to said clutch and brake and for exhausting liquid pressure therefrom and thereby effecting the required changes of transmission ratios, said hydraulic means including a clutch circuit and a brake circuit for conducting the liquid pressure to the clutch and brake respectively, clutch circuit control means to vary the pressure in the clutch circuit according to the degree of an engine throttle opening, and brake circuit control means for increasing and decreasing the pressure in the brake circuit consequent upon increase and decrease respectively of pressure in the clutch circuit. The result of this is that the liquid pressure supplied to the brake or brakes varies in accordance with throttle opening and thus the torque capacity of the brake varies in accordance with the torque it is required to carry. The liquid pressure applied may be such that when changing down the engine can reach the required speed before the clutches and brakes finally engage for producing the required ratio.

If desired the brakes (and clutches) may have their liquid pressure spaces connected to cylinders containing spring pressed pistons whereby additional liquid capacity is available, the volume of which is varied by choice of the rate of the springs and the modulated pressure which upon connecting said space to exhaust provides sufficient liquid pressure to maintain the brake on while changing up until the next brake is engaged. The said space may be opened to exhaust through a large opening for changing down and through a small opening for changing up.

The invention will now be further described by way of example with reference to the accompanying diagrammatic drawings wherein:

Figure 1 is a diagram of an apparatus made in accordance with the invention; and Figures 2, 3 and 4 are cross-sectional views of a valve member on the planes indicated by the arrows 2, 3 and 4 on Figure 1.

Figure 6 is an elevational view of an engine and controls thereof, and the apparatus of Figure 5.

Figure 5:
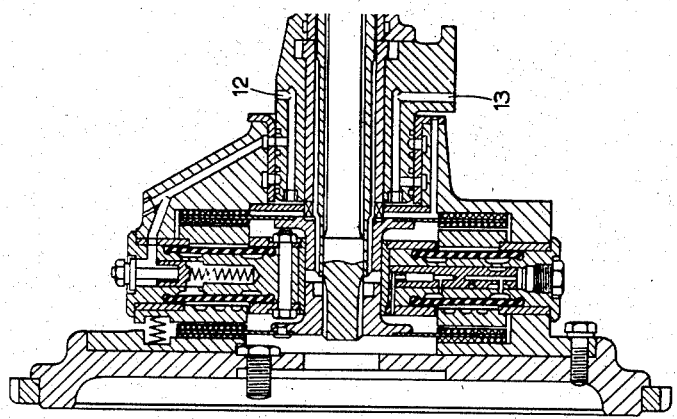
Figure 5 is a cross-sectional view of a power transmission gear with which the apparatus of Figure 1 may be used.

The invention is applied to a power transmission gear similar to that described in the specification of our patent application 20,162 of 1952 and having an epicyclic gearing controlled by two input clutches and three reaction brakes. The clutches and brakes are of the friction-engaging type each having a space to receive liquid pressure for effecting engagement and an exhaust duct leading from said space. The clutches have centrifugally acting valves which control the build up of pressure in said spaces, i.e. a valve which exhausts the clutch pressure spaces when the engine falls below a predetermined value.

The supply of liquid pressure to said spaces is controlled by ports in a movable valve member 10 and ducts in a cylinder 11 in which the member 10 is slidably disposed. The member 10 may be moved by hand or by automatic means.

The first clutch space is connected to a duct 12 and the second clutch space is connected to a duct 13. The spaces of the brakes providing first, second and third ratios respectively are connected to ducts 14, 15, 16. Ducts 18, 19, 20 serve for exhausting liquid from said spaces. All these ducts open into the cylinder 11. The right hand end of the cylinder is connected to exhaust.

The member 10 has ports 22, 23 which can connect with the ducts 12, 13, 14, 15, 16 for introducing liquid pressure to the clutches and brakes. The port 22 is enlarged to form slots 24.

The member 10 also has straight through ports 25, 26, 27, 28 and 29 serving to connect the ducts 12, 14, 15, 16 to the exhaust ducts 18, 19, 20, the port 29 being restricted as shown in relation to the others.

Liquid pressure is supplied by a pump 30 having an intake channel 31 and an output channel 32. The latter is connected to two ducts 34, 35 connected to the cylinder 11 and forms a brake circuit. The channel 32 is also connected through a conduit 37 with the cylinder 38 having an exhaust opening 39 controlled by a relief valve 40. The exhaust opening 39 is connected through a duct 50 to two clutch pressure ducts 41, 42 that are connected to the cylinder 11. The opening 39 and ducts 41, 42 and 50 constitute a clutch circuit.

The channel 41 is also used to supply pressure to a brake through duct 16 for third ratio.

The ducts 34, 35 can be connected through the port 23 to either of the ducts 14, 15 respectively. The ducts 41, 42 can be connected by the ports 22, 23 with the ducts 12, 13, 16.

Thus:

*1st ratio.*—The parts are in the position shown. Liquid pressure is supplied from 34, 23, 14 to the first brake. Liquid pressure in duct 15 is exhausted through 26, 19 and that in the duct 16 is exhausted through 25, 20. Duct 12 is supplied from 42, 22. Liquid pressure in duct 13 is exhausted through the cylinder 11.

*2nd ratio.*—The valve member 10 will be moved one step to the right to bring port 23 into line with 35, 15 to supply the second brake, the other duct 14 being exhausted through 29. Clutch duct 12 remains supplied through slot 24 and port 22. Duct 13 remains exhausted.

*3rd ratio.*—The valve member 10 will be moved one further step to the right to bring port 23 into line with 41, 16 so that the latter is supplied. Duct 15 is exhausted through 29. Duct 12 remains supplied and 13 exhausted as before.

*Top gear.*—A further step to the right causes 14, 15, 16 all to be exhausted and 12, 13 to be supplied through 24, 22, 42.

The brake circuit 32, 34, 35 and clutch circuit 41, 42 are connected through the opening 39 to constitute the controlling hydraulic supply circuit of the gear.

The clutch circuit is connected by channels 50, 51 to a cylinder or bore 52 having an exhaust opening 53 controlled by a movable relief valve member 54 that is urged towards its closing position by resilient means in the form of a spring 55 that surrounds a stem 56 on the member 54. The stem 56 is hollow and contains a spring 58 that seats on a flange 60 on a pin 61 which is movable in the direction to compress the spring by a lever 62 pivoted at 63 and connected by a link 64 to one end of a throttle control or accelerator lever 65 that is pivotally mounted at 66 and carries the usual pedal 67. The lower end of the bore 52 has an exhaust opening 21.

The relief valve member 40 is urged towards its closing position by a spring 70 which seats on a piston 71 that is slidable in a cylinder 72. This cylinder is connected by a channel 74 with the clutch circuit 50, 41, 42, 51, 52. A pin 73 on the member 40 provides a stop to limit the movement of the piston 71.

The piston member 40 has a part of reduced diameter 75 which leaves a space 76 in the cylinder 38 which space is connected by a channel 78 with the duct 14 of the first brake.

The duct 15 is connected by a conduit 80 to a cylinder 81 that contains a piston 82 urged by a spring 83 in the direction to express the liquid from the cylinder 81. Similarly the duct 16 is connected by a conduit 85 to a cylinder 86 containing a piston 87 and spring 88.

When liquid pressure is applied to the duct 15, and the brake to which it leads, the piston 82 will move under pressure against the spring 83, thereby retaining a volume of oil in the cylinder which must be exhausted when the brake is disengaged. Similarly, when the pressure is opened to the duct 16, pressure will act upon the piston 87 and spring 88 thereby displacing the piston so as to contain a volume of oil in the cylinder.

In operation, when an engine connected to the transmission apparatus is running, with the throttle closed to the engine idling position, the pump 30 will be delivering pressure to the channels and ducts 32, 34, 35, 38, 39, 50, 41, 42, 51, 52. The pressure in the channel 50 will be controlled by the spring 55. The spring 58 under these circumstances may be fully extended and the pressure in the channel 50 is a minimum dependent on the force from the spring 55. The pressure in the channel 32 will also be a minimum and will either be controlled by the spring 70, or the load on the piston 71, which is determined by the pressure in the channel 74. If the throttle is opened, and the engine caused to deliver greater power, the movement of the pedal 67 will have caused the pin 61 to compress the spring 58 thereby increasing the load on the relief valve 54 and the pressure in the channel 50. This in turn will increase the pressure in the channel 74, and the load on the piston 71 and on the relief valve 40, thereby increasing the pressure in the channel 32. The pressure in the channels 34, 35 will therefore be varied in accordance with the position of the pedal 67 and the torque which is to be transmitted by the brakes to which these channels may lead. Similarly, the pressure in the channels 41, 42 will be varied to suit the torque to be transmitted by the 3rd ratio brake and the clutches. In changing, for example, from 2nd ratio to 3rd ratio, the 2nd ratio brake will not be disengaged until the liquid in the cylinder has been exhausted through the restriction in the port 29, thereby providing an overlap and continuous traction. The volume of the liquid in the cylinder 81 will depend on the position of the pedal 67 for if the throttle is wide open, and pin 61 moved fully inwards, the pressure in the channel 35 will be higher and therefore the pressure in the cylinder 81 will be higher, causing greater displacement of the piston 82 against the spring 83, whereby the overlap will be increased in accordance with the torque being transmitted and the position of the throttle pedal 67. Similarly, in changing from 3rd to 4th ratio the pressure in the channel 41 will determine the volume in the cylinder 86 and the degree of overlap obtained in changing from 3rd to 4th ratio.

In hydraulic systems of this kind difficulties can arise from lack of delivery from the pump when the engine is idling slowly, particularly when the liquid is very thin. This may result in unduly slow engagement of the clutches and brakes when selected. The difficulty arises owing to leakage in the pump when operating against substantial pressure. The present invention overcomes this defect for when the throttle is in the normal position of rest pressure maintained in the channel 32 may be much lower than that normally required to transmit the torque. The delivery of the pump to channels 32 and 50 will be much greater than if the pressure maintained in the channel 32 were, under these conditions, sufficiently great to transmit the engine torque. When applied to variable ratio transmission of the kind having an input friction clutch with a centrifugally actuated valve to control the build up of pressure, such as is shown in Figure 5, and the engine is idling the pressure in the channel 42 may be substantially zero, and the pressure in the channel 74 will therefore also be about zero. Pressure in the channel 32 will then be only that provided by the light spring 70, with the result that under these circumstances the pump 30 works under light load, and the delivery to the channel 50 and to the clutches is not unduly reduced.

It will be observed that when the valve member 10 is moved to the right, for making an "up" change, i.e. to change from 1st to 2nd, 2nd to 3rd, or 3rd to 4th, the brake previously in operation must exhaust through the restriction in the port 29. For making "down" changes, when the valve is moved to the left, the brakes are exhausted through a non-restricted port, such as 25, 26.

The purpose of the channel 78, leading to the space 57, is to apply pressure to the space 76 when 1st ratio is selected. Pressure in the space 76 acts on the relief valve 40 thereby reducing its effective area. This increases the pressure for 1st ratio when the torque to be carried is much greater. A channel 90 may be provided leading to the clutch relief valve cylinder 52 and can be used in a similar manner for increasing the pressure in certain of the ratios.

For down changes it is desirable to engage the brake more rapidly with wider throttle opening, because the engine speed will increase more rapidly with greater throttle opening. This is achieved with the present invention, the increase of throttle opening effecting increasing of pressure on the spring 58 thereby increasing pressure in the clutch and brake circuit.

I claim:

1. In an apparatus comprising an internal combustion engine provided with an accelerator pedal and connected with a variable-ratio power transmission apparatus having at least one input engagement clutch and at least one reaction brake, the provision of hydraulic means including a valve control device for supplying liquid pressure to each said clutch and brake and for exhausting liquid pressure therefrom and thereby effecting the required changes of transmission ratios, said hydraulic means including a clutch circuit and a brake circuit for conducting the liquid pressure to each clutch and brake respectively, clutch circuit control means to vary the pressure in the clutch circuit according to the degree of movement of the accelerator pedal and brake circuit control means for increasing and decreasing the pressure in the brake circuit consequent upon increase and decrease respectively of pressure in the clutch circuit.

2. Apparatus as claimed in claim 1 wherein the brake circuit control means comprises a relief valve having an exhaust opening in communication with the clutch circuit, said hydraulic means includes a pump having its output connected to the brake circuit, resilient means urging said relief valve in the direction to close said exhaust opening, said clutch circuit including a duct leading pressure therein to said relief valve urging it also in the direction to close.

3. Apparatus as claimed in claim 2 wherein the resilient means is a spring compressed between the valve and a piston which is urged towards said spring and valve by the pressure in said duct.

4. Apparatus as claimed in claim 2 having at least one further reaction brake, one of the said brakes being a first ratio brake which is engaged for producing first transmission ratio and the other of which brakes is engaged for producing another transmission ratio, and the brake circuit includes a channel connecting the first ratio brake with said relief valve so that the pressure in said channel urges the valve in the closing direction.

5. Apparatus as claimed in claim 1 having at least one further brake supplied with liquid at the same pressure as the clutch.

6. Apparatus as claimed in claim 1 and including at least one further brake and wherein at least one of the brakes has a liquid pressure space therein connected with a variable capacity space which maintains the brake on while changing up until the next brake or clutch is engaged, said variable capacity space being in communication with the brake circuit so that the quantity of liquid in said variable capacity space increases with increasing throttle opening.

7. Apparatus as claimed in claim 6 wherein said variable capacity space has a movable wall in the form of a spring pressed piston.

8. Apparatus as claimed in claim 1 wherein said hydraulic means includes two exhaust ports for said reaction brake, one more restricted than the other, the more restricted port being brought into use when making up changes, the less restricted port being brought into use when making down changes.

9. Apparatus as claimed in claim 8 wherein said ports are formed in a movable element of said valve device.

10. Apparatus as claimed in claim 1 wherein the clutch circuit control means includes a relief valve.

11. Apparatus as claimed in claim 10 wherein the clutch relief valve is urged by two springs towards its closing position and one of said springs is urged to increase closing pressure with increase of throttle opening.

12. Apparatus as claimed in claim 10 wherein liquid pressure from the clutch circuit or brake circuit is applied to the clutch relief valve to assist closing.

13. Apparatus as claimed in claim 1 wherein there is a further clutch and the clutches are friction engaging clutches provided with centrifugally acting valves which control build up of liquid pressure in the clutches.

References Cited in the file of this patent
UNITED STATES PATENTS

| | | |
|---|---|---|
| Re. 20,565 | Staude | Nov. 30, 1937 |
| 1,919,930 | Cash | July 25, 1933 |
| 1,991,202 | Flamini | Feb. 12, 1935 |
| 2,324,693 | Griswold et al. | July 20, 1943 |